United States Patent
Zernickel et al.

(10) Patent No.: US 6,257,605 B1
(45) Date of Patent: *Jul. 10, 2001

(54) SUSPENSION STRUT BEARING

(75) Inventors: Alexander Zernickel; Herbert Erhardt, both of Herzogenaurach (DE)

(73) Assignee: Ina Walzlager Schaeffler oHG (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,576

(22) Filed: Jun. 26, 1998

(30) Foreign Application Priority Data

| Jun. 30, 1997 | (DE) | 197 27 666 |
| Nov. 26, 1997 | (DE) | 197 52 268 |
| Nov. 26, 1997 | (DE) | 197 52 269 |
| Mar. 4, 1998 | (DE) | 198 09 074 |

(51) Int. Cl.[7] ................................................. B60G 15/00
(52) U.S. Cl. ................. 280/124.147; 280/124.155; 267/220; 267/221
(58) Field of Search .................. 280/124.147, 124.155, 280/124.145; 267/220, 221

(56) References Cited

U.S. PATENT DOCUMENTS

| 3,346,272 | * | 10/1967 | Smith . | |
| 4,175,771 | * | 11/1979 | Muzechuk . | |
| 4,200,307 | * | 4/1980 | Szabo | 267/221 |
| 4,248,454 | * | 2/1981 | Cotter et al. | 280/124.147 |
| 4,256,292 | * | 3/1981 | Sullivan, Jr. et al. | 267/140.2 |
| 4,274,655 | * | 6/1981 | Lederman | 280/688 |
| 4,497,523 | | 2/1985 | Lederman . | |
| 4,721,325 | * | 1/1988 | Mackovjak et al. | 280/124.147 |
| 4,804,169 | * | 2/1989 | Hassan | 280/124.155 X |
| 4,805,886 | * | 2/1989 | Hassan | 280/124.147 X |
| 4,817,983 | * | 4/1989 | Virani | 280/124.147 |
| 5,112,077 | * | 5/1992 | Makita | 267/220 X |
| 5,232,209 | | 8/1993 | de Fontenay . | |
| 5,308,048 | * | 5/1994 | Weaver et al. | 267/220 |
| 5,454,585 | * | 10/1995 | Dronen et al. | 280/124.147 |
| 5,467,971 | | 11/1995 | Hurtubise et al. . | |
| 5,487,535 | | 1/1996 | Carter et al. . | |
| 5,678,808 | * | 10/1997 | Claude et al. | 267/64.15 |
| 5,678,844 | * | 10/1997 | Dassler et al. | 280/124.147 |

FOREIGN PATENT DOCUMENTS

| 1975536 | 10/1967 | (DE) . |
| 2329910 | 1/1975 | (DE) . |
| 2658748 | 6/1978 | (DE) . |
| 3034743 | 4/1982 | (DE) . |
| 3248634 | 7/1984 | (DE) . |
| 3514067 | 10/1985 | (DE) . |
| 3741861 | 6/1989 | (DE) . |
| 690011377 | 7/1993 | (DE) . |
| 69013777 | 7/1993 | (DE) . |
| 4408859 | 7/1995 | (DE) . |
| 29506796 U | 8/1995 | (DE) . |

OTHER PUBLICATIONS

M. Troster, "Ein . . . Personenwagon", ATZ Automobiltechnische Zeitschrift, 83, 1981, 7/8, S. 340.

* cited by examiner

*Primary Examiner*—Robert P. Olszewski
*Assistant Examiner*—Lynda Jasmin
(74) *Attorney, Agent, or Firm*—Bierman, Muserlian and Lucas

(57) ABSTRACT

The invention concerns a suspension strut (1) for automotive vehicles comprising a shock absorber (20) to which a coil spring (21) is associated, the suspension strut (1) being connected to a steering knuckle (5) and a vehicle body (4) at articulation points (2, 3), the upper articulation point (2) comprising a bearing (6) which is associated to carrier elements (10, 11).

According to the invention, the bearing (6) comprises bearing rings (7, 8) which are supported directly on carrier elements (10, 11) and centered on radially spaced rims (12, 13), the carrier elements (10, 11) being made of different materials.

9 Claims, 5 Drawing Sheets

SUSPENSION STRUT BEARING

FIELD OF THE INVENTION

The invention concerns a suspension strut for the suspension of wheels of an automotive vehicle. The suspension strut preferably used for front wheels comprises a shock absorber and a coil spring arranged coaxially around the shock absorber, the suspension strut being connected to a steering knuckle and a vehicle body at articulation points. A bearing, particularly a thrust ball bearing or an angular contact thrust ball bearing is arranged between the suspension strut and the vehicle body and is mounted sealed while being surrounded by annular carrier elements.

BACKGROUND OF THE INVENTION

In present day vehicles, so-called McPherson suspension struts are in common use. They generally comprise two relatively rotatable elements provided with a bearing arranged therebetween to facilitate rotation while at the same time permitting load transmission between the elements. The two relatively rotatable elements are generally a spring seat or bearing and an elastic damping element. For assuring a proper functioning of the spring bearing, particularly of the rolling bearing, it is necessary to protect the bearing components from pollutants such as road dust and humidity.

A suspension strut of the pre-cited type known from DE 69 001 377 T2 comprises a bearing having two bearing rings in which ball-shaped rolling elements are guided. The bearing rings are nested in plastic retention elements which are arranged centered in axially spaced carrier elements made of steel.

Besides being an expensive construction, this known bearing arrangement does not possess adequate rigidity for an elastic damping element, for example, a rubber-cushioned upper carrier element. In addition, this bearing arrangement with its many components requires a large design space.

OBJECTS OF THE INVENTION

It is an object of the invention to eliminate the aforesaid drawbacks by creating an economic mounting arrangement for a suspension strut offering adequate rigidity while being further optimized with respect to design space requirement and number of components.

This and other objects and advantages of the invention will become obvious from the following detailed description.

SUMMARY OF THE INVENTION

In the suspension strut bearing of the invention, the bearing rings of the rolling bearing are supported and centered directly on carrier elements. The only components making up the bearing of the invention are rolling elements guided in bearing rings which are surrounded by carrier elements, the bearing rings being centered on rims of the carrier elements which point axially towards each other. Compared to the prior art, the bearing of the invention has an improved rigidity as well as a clearly reduced number of components so that the design space requirements of the bearing is likewise reduced. Due to the characteristic structure of suspension struts, forces are introduced into the bearing obliquely so that the carrier elements are differently loaded. According to the invention, the structure of the carrier elements is adapted to their specific loading i.e., they have different configurations from each other and are made of different materials. Preferably, the carrier element which is supported on an elastic damping element is made of a material of higher strength so that it can have a relatively thin-walled configuration and still possess adequate strength. The weight and size optimized suspension strut bearing of the invention is further characterized by a small number of components which results in a cost advantage. The invention also covers carrier elements which can be made chiplessly by deep drawing or by injection molding. A further advantage of the invention is that the coil spring is supported directly on one of the carrier elements.

In one embodiment of the invention, the bearing is surrounded by carrier elements having rims which are radially offset to each other for centering the bearing. Alternatively, the rims of the carrier elements which point axially towards each other are associated to the inner sides of the bearing rings which are thus centered on the inside.

In a further advantageous embodiment of the invention, the rim of one of the carrier elements centers one of the bearing rings on the inside while the rim of the other carrier element centers the second ring on the outside.

In a preferred embodiment of the invention, one of the carrier elements is made of steel sheet while the other carrier element is made of plastic. The invention also covers the combination of a carrier element made of aluminium with a carrier element made of plastic. Alternatively, the suspension strut of the invention may also be provided with carrier elements made of other materials.

Preferably, the carrier element associated to the vehicle body is made of plastic and the carrier element associated to the coil spring of the suspension strut is made of steel sheet. Such an arrangement of the carrier elements prevents a transmission of structure-borne noise from the wheel guide to the vehicle body. For a further insulation of structure-borne noise, a damping disc can be arranged between the carrier element concerned and the vehicle body.

According to an advantageous feature of the invention, the carrier element made of plastic has a pot-shaped configuration and comprises on its inner and its outer side, a circumferential rim pointing towards the coil spring.

A further measure provided by the invention for reducing the manufacturing costs of the bearing is to use a wire as a base material for making the bearing rings. The wire is first shaped into a ring-shape and the ends of the wire are welded together before the rolling element raceway is formed on one side of the wire ring by axial stamping. Such a method of a chipless manufacturing of the bearing rings possesses a further potential for cost saving and can thus contribute to an economic manufacture of the rolling bearing as a whole. The drawing process by which the wire is made effects a work hardening of the material of the wire. This hardening is maintained even in the chiplessly stamped rolling element raceways of the invention which thus do not differ from the usual type of bearings with regard to strength and durability.

To improve the natural rigidity of the steel sheet carrier elements which in the installed position is remote from the coil spring, this carrier element comprises a bottom with a radially multi-stepped configuration. Said carrier element further comprises both on an inner and an outer side a circumferential rim pointing towards the coil spring. The other carrier element of the suspension strut is made of plastic. This carrier element made preferably as a plastic injection molding extends in the installed state to near the inner contour of the other carrier element forming a gap therewith.

To optimize its weight, the plastic carrier element is configured with chamber-like recesses which are arranged preferably concentrically therewithin and open towards the other carrier element which is made of steel sheet. To provide an adequate rigidity, the chamber-like recesses are interrupted by radially dispensed webs and web walls.

According to a further feature of the invention, the carrier elements engage into each other in the installed state. This is achieved by the fact that the rims of the steel carrier element engage around end regions of an inner and outer wall of the plastic carrier element. This measure prevents a detrimental penetration of pollutants and humidity into the suspension strut bearing. A further measure provided by the invention for improving sealing is to make at least parts of an end region of a wall of the plastic carrier element with a stepped configuration which results in the formation of a elongated, labyrinth-like sealing gap in the region of overlap of the carrier elements.

According to still another feature of the invention, the two carrier elements are secured to each other by positive engagement to form a pre-assembled unit including all the components of the suspension strut bearing. A simple and effective means for obtaining this is to make the outer rim of the steel carrier element with a radially inwards bent collar which snaps positively on to a radial, preferably circumferential projection of the other carrier element. Alternatively, a positive snap connection can be provided on the inside of the carrier elements.

In a further advantageous embodiment of the invention, the plastic carrier element comprises an integrally formed, axially projecting extension on the outside of which an end of the coil spring is centered. This solution dispenses with the hitherto generally used additional damping element for the support of the coil spring.

The invention further provides a bearing in which the damping element cooperates with the steel carrier element which means that the damping element is supported on an outer path i.e., on the carrier element nearer the shock absorber. Preferably, the damping element is vulcanized on the steel carrier element and forms one unit therewith. Alternatively, the invention also provides a damping element snapped positively on the carrier element, or a loose arrangement of the damping element. To limit the displacement of the suspension strut, the damping element is supported on an extension of the shock absorber.

The invention will now be described more closely with the help of examples of embodiment illustrated in the appended figures.

DETAILED DESCRIPTION OF THE DRAWINGS

Figure 1:
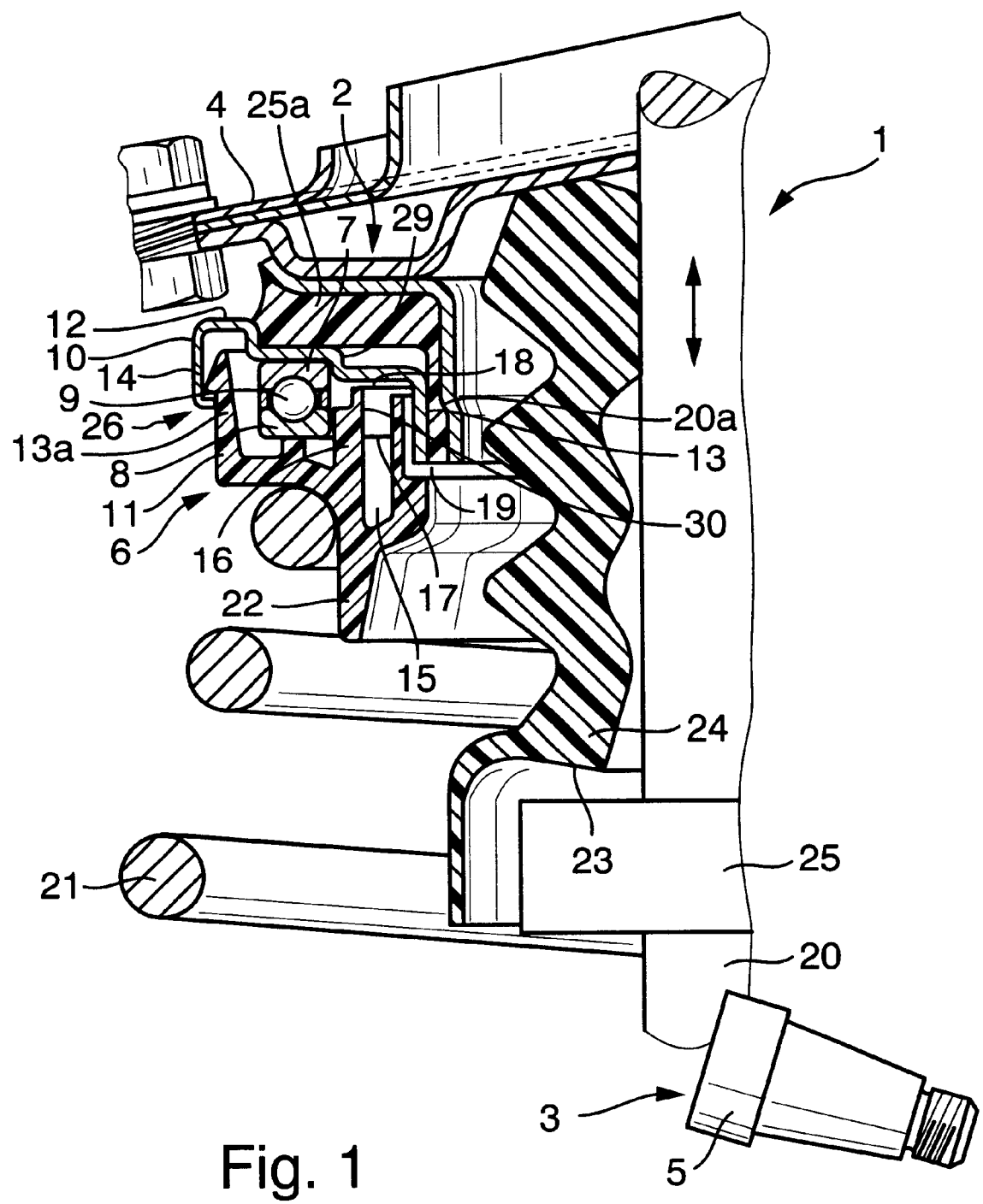
FIG. 1 is a semi-section of a suspension strut of the invention in the region of the upper articulation point.

FIG. 1 shows the structure of a suspension strut bearing of the invention. The suspension strut 1 is secured at articulation points 2, 3 on a vehicle body 4 and a steering knuckle 5. At its end nearer the articulation point 2 on vehicle body 4, the suspension strut 1 is provided with a bearing 6 comprising two bearing rings 7, 8 between which rolling elements 9 are guided. The bearing rings 7, 8 of the bearing 6 which is configured as a thrust bearing are supported directly on carrier elements 10, 11 and centered on rims 29, 30 of the carrier elements 10, 11 extending inwardly of the bearing rings 7, 8 towards each other in axial direction. The carrier elements 10, 11 of the bearing 6 differ from each other in configuration and are made of different materials. The carrier elements 10 which is associated to the bearing ring 7 is made of steel sheet and defines a pot-shaped housing having a bottom 12 which is radially multi-stepped to obtain an improved self-rigidity.

The stepped bottom 12 of the carrier element 10 further permits a centering of the bearing ring 7 on the carrier element 10. The carrier element 10 comprises an inner an outer axial rim, 13 and 14, extending in the same direction while being radially spaced from the bearing ring 7 and preferably having a circumferentially continuous configuration, which inner and outer rims enclose an end region of the carrier element 11. The further carrier element 11 which is associated to the bearing ring 8 is made as an injection molding and likewise has circular ring-shaped contour into which the bearing ring 8 is inserted. To avoid a detrimental accumulation of material and for weight optimization, the carrier element 11 is provided with chamber-like recesses 15 which are annularly arranged in different radial planes while being separated from one another by web walls 16 and radially extending webs 17. One end of the carrier element 11 extends to near the carrier element 10 to form a gap 18 therewith. The rims 13 and 14 enclose the end region of the carrier element 11 with formation of a small annular gap. To form an elongated, labyrinth-like annular gap 19, an inner surface of the carrier element 11 comprises a radial step 20a which is substantially filled by the rim 13 of the carrier element 10. The carrier element 11 further serves to support and center a coil spring 21 which rests directly on the carrier element 11 i.e., without the use of the hitherto commonly used elastic intermediate element. Centering is achieved by an axial extension 22 which is integrally formed on the carrier elements 11 and surrounded by an end of the coil spring 21.

When the vehicle is being driven, the unevenness of the road and an unbalance of the wheels cause a movement of the suspension strut 1 which is indicated in FIG. 1 by the double arrow. Because the suspension strut 1 is installed in an oblique position, a displacement of the articulation points 2, 3, which can also occur during a steering operation, causes a rotation of the carrier element 11, which is connected to the coil spring 21, relative to the carrier element 10, said rotation being made possible by the bearing 6. The suspension strut 1 further comprises a damping element 24 having an end pressure stop face 23 which, in conjunction with an extension 25 of a shock absorber 20 connected to the suspension strut 1, forms an elastic end stop. To assure a structure-borne-noise insulated arrangement of the bearing 6 on the vehicle body 4, the carrier element 10 is connected to the vehicle body 4 in the region of the articulation point 2 via a damping ring 25a.

Figure 2:
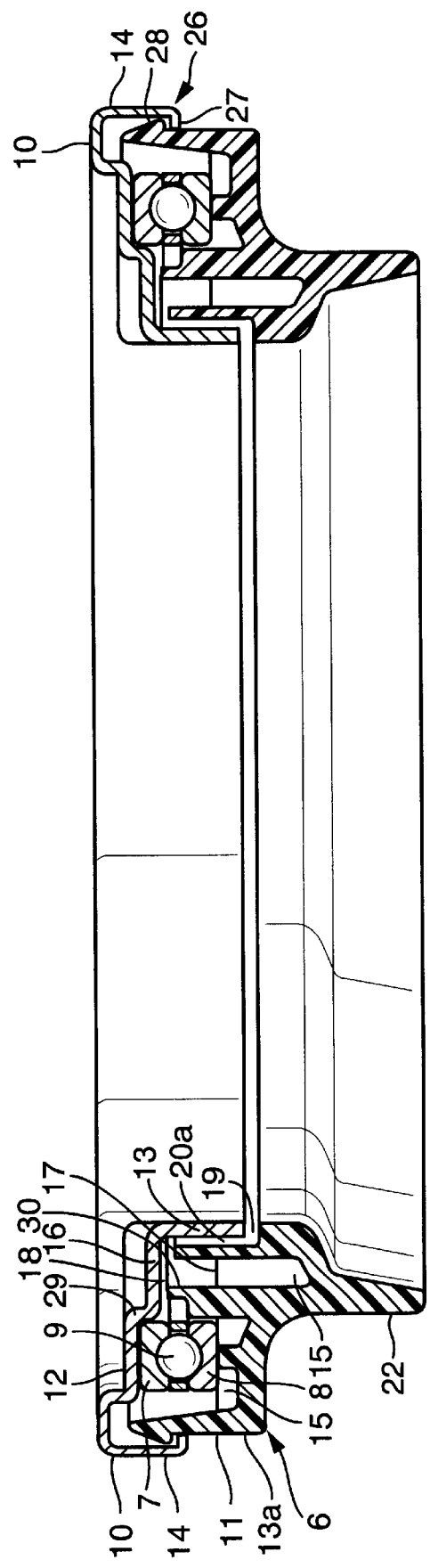
FIG. 2 is a detail showing the suspension strut bearing of FIG. 1.

The structure of the bearing 6 of the invention can be seen more clearly in the sectional view of FIG. 2 in which the individual components have the same reference numbers as in FIG. 1. To form a pre-assembled unit, the bearing 6 is provided with a positive snap connection 26 between the carrier elements 10, 11. This is realized by the fact that an end of an outer rim 14 of the carrier element 10 comprises a radially inwards directed collar 27 which, in the installed state, positively engages an outwards directed projection 28 of the carrier element 11.

Figure 3:
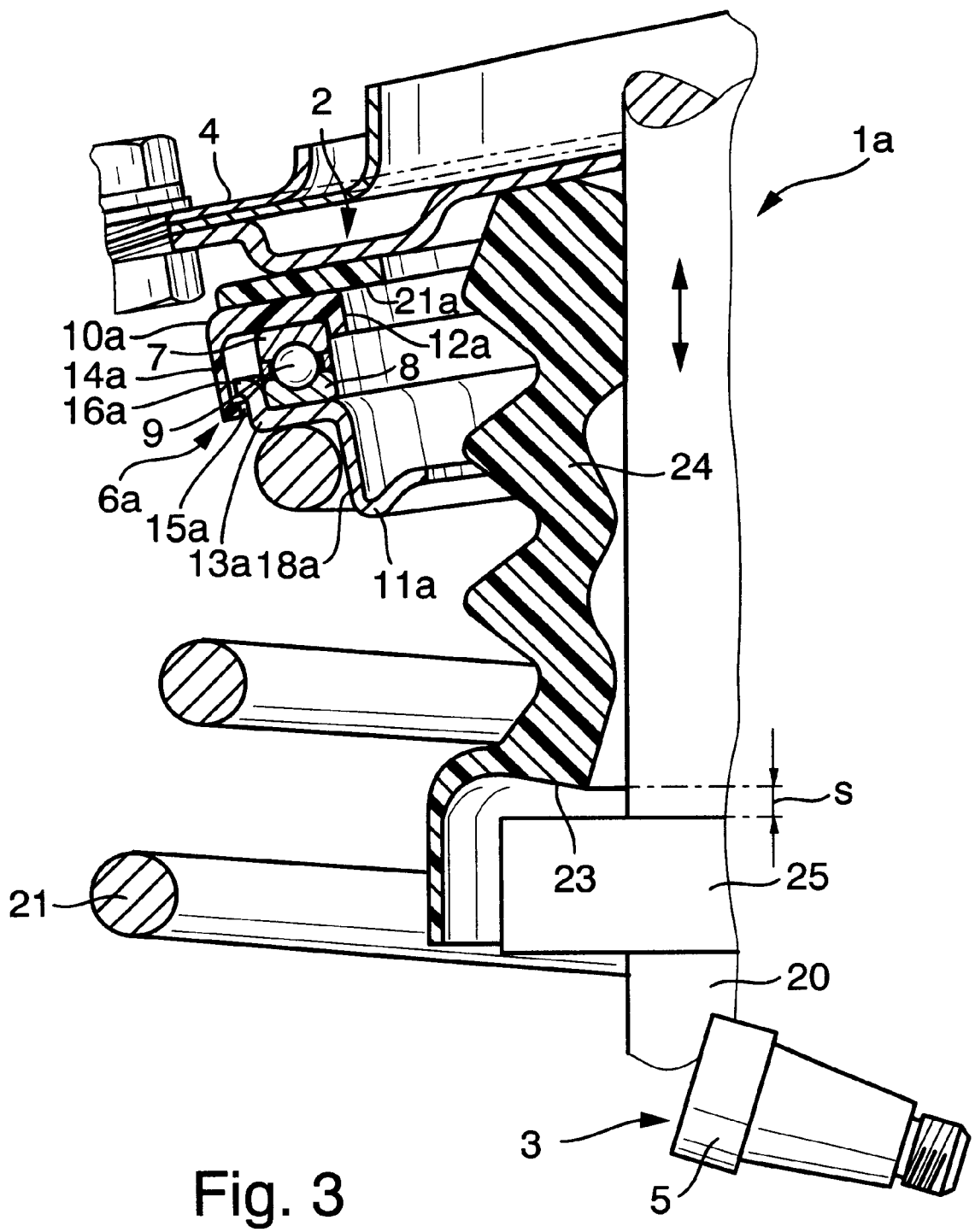
FIG. 3 shows a suspension strut of the invention having an alternative configuration of that of FIG. 1 with the upper bearing ring of the rolling bearing being centered on the inside and the lower ring of the rolling bearing being centered on the outside.

Another embodiment of the suspension strut bearing of the invention is shown in FIG. 3. The suspension strut 1a of this embodiment, like the suspension strut 1 of FIG. 1, is secured to a vehicle body 4 and a steering knuckle 5 at two points of articulation 2, 3. At its end nearer the point of articulation 2 on the vehicle body 4, the suspension strut 1a is provided with a bearing 6a comprising two bearing rings 7, 8 and rolling elements 9 guided between said bearing rings 7, 8. The bearing rings 7, 8 of the bearing 6a, which is made as a thrust bearing are supported directly on the carrier elements 10a, 11a and centered on rims 12a and 13a which are arranged radially spaced from each other and extend towards each other in axial direction. The rim 12a centers the bearing ring 7 on the inside while the rim 13a centers the bearing ring 8 on the outside. The carrier elements 10a, 11a of the bearing 6a have different configurations and are made of different materials. The carrier element 10a associated to the bearing ring 7 is made as a plastic injection molding and defines a pot-shaped housing. The carrier element 11a, on the contrary, is a deep-drawn part made of steel sheet on which the bearing ring 8 is supported.

The carrier element 10a comprises a further axially extending rim 14a which extends preferably over the entire circumference of the carrier element 10a while being arranged radially outwardly spaced from the bearing ring 7 and encloses an end region 16a of the rim 13a of the carrier element 11a with formation of an annular gap 15a. The carrier element 11a further serves to support and center the coil spring 21. Centering is achieved by an axial extension 18a of the carrier element 11a which is integrally formed on said carrier element 11a and surrounded by an end of the coil spring 21.

During springing movements of the suspension strut 1a, a pressure stop face 23 comes to abut against an extension 25 of the shock absorber 20 upon completion of a stroke "s". In this structure strut 1a, the damping element 24 is therefore articulated on an inner path. To obtain a structure-borne-noise insulated arrangement of the bearing 6a on the vehicle body 4, the carrier element 10a is connected to the vehicle body 4 in the region of the point of articulation 2 via a damping ring 21a.

Figure 4:
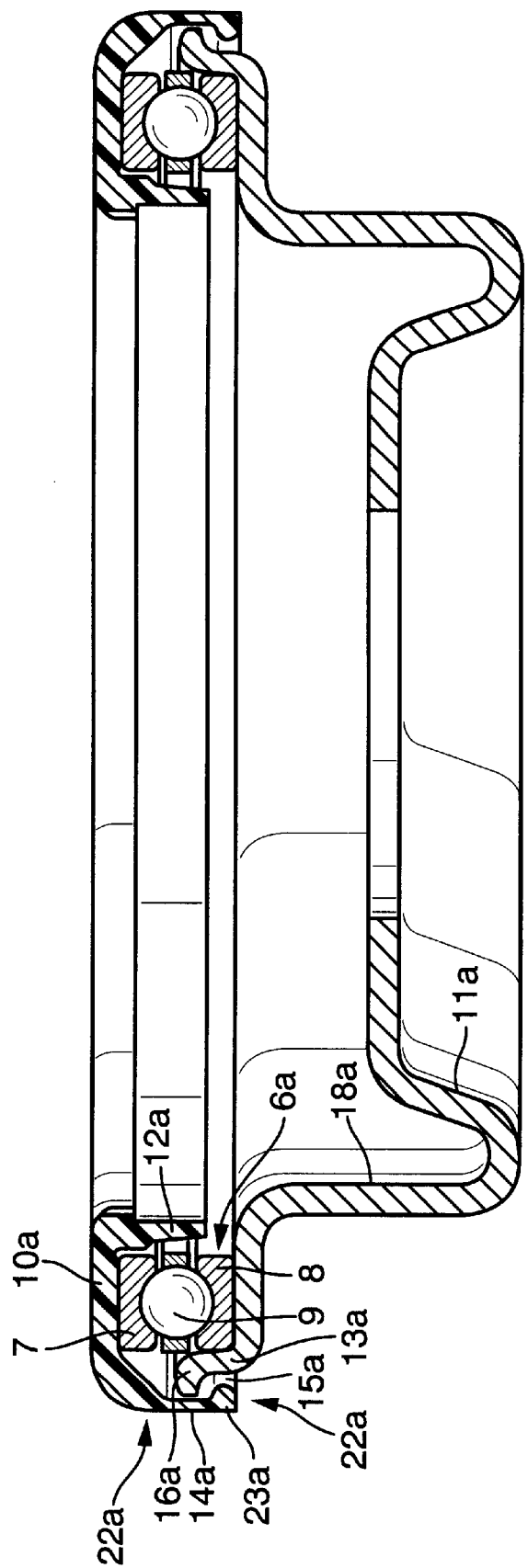
FIG. 4 is a detail showing the suspension strut bearing of FIG. 3.

The structure of the bearing 6a of FIG. 3 can be seen more clearly in the sectional view of FIG. 4 in which the individual components have the same reference numbers as in FIG. 3. To form a pre-assembled unit, the bearing 6a is provided with a snap connection 22a between the carrier elements 10a, 11a. The snap connection is realized by the fact that an end of the rim 14a of the carrier element 10a comprises a radially inwards directed collar 23a which, in the installed state, positively engages an outwards directed projection of the end region 16a of the carrier element 11a.

Figure 5:
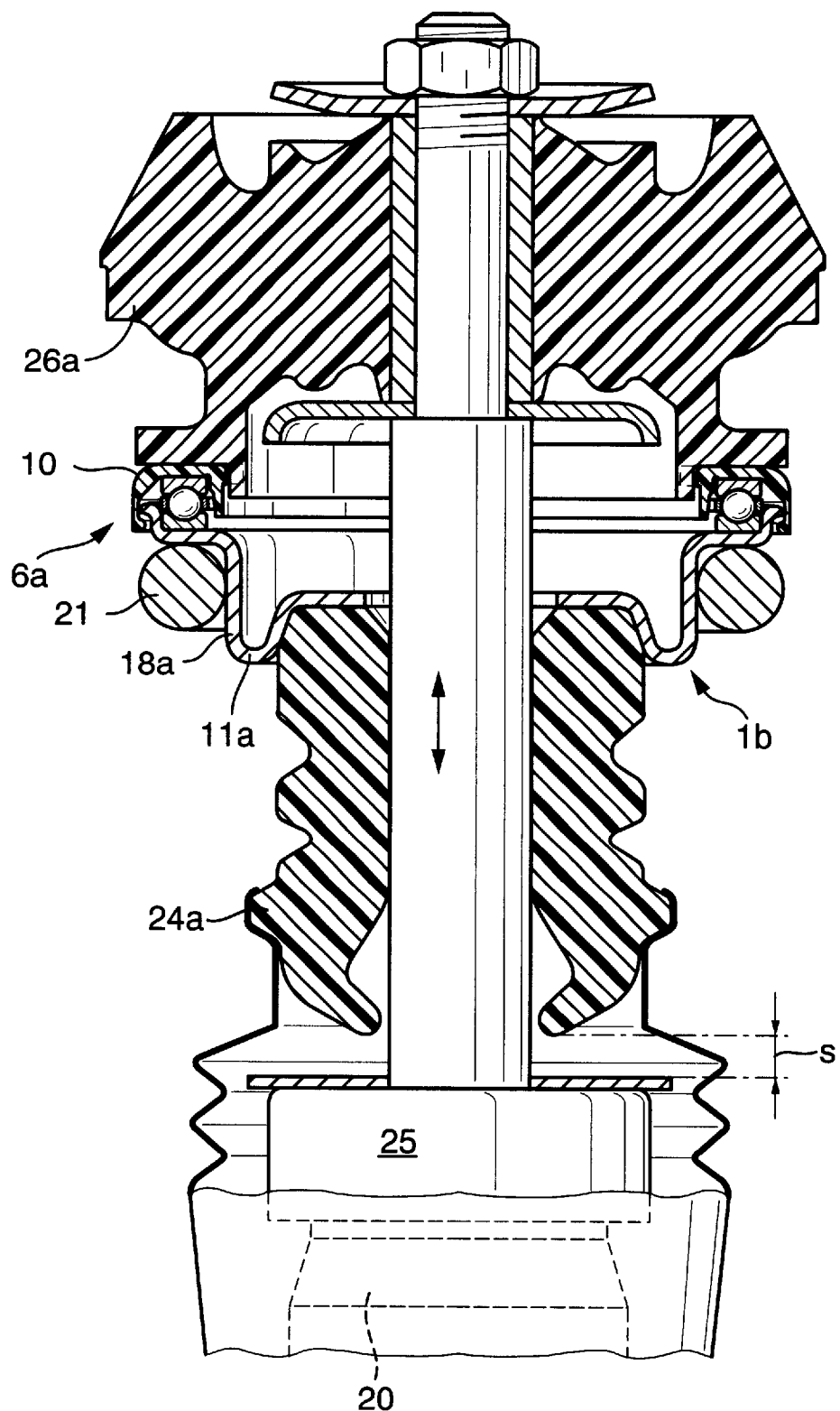
FIG. 5 shows a suspension strut of the invention whose damping element is articulated on the carrier element nearer the shock absorber i.e., on the outer path.

The suspension strut 1b shown in FIG. 5 differs from the suspension strut 1a of FIG. 3 in that the damping element 24a is supported on the carrier element 11a which is made of steel sheet. To form a one-piece component, the damping element 24a is vulcanized on the carrier element 11a. During springing movements of the suspension strut 1b, the damping element 24a comes to abut against the extension 25 of the shock absorber 20 upon completion of the stroke "s". Above the bearing 6a in FIG. 5 there is further shown a rubber support bearing 26a which is associated to the suspension strut 1b.

What is claimed is:

1. A suspension strut (1a) used in a wheel suspension of an automotive vehicle comprising a shock absorber (20) and a coil spring (21) arranged substantially coaxially around the shock absorber (20), said suspension strut (1a) being connected to a steering knuckle (5) and a vehicle body (4) at articulation points (2, 3), a bearing (6a) being mounted sealed between the suspension strut (1, 1a) and a vehicle body (4) while being surrounded by a first carrier element (10a) associated to the vehicle body (4) and a second carrier element (11a) oriented toward the shock absorber (20), one of which carrier elements cooperates with a damping element (24) for forming an elastic end stop, characterized in that the bearing (6a) is supported by one bearing ring (7, 8) directly on each carrier element (10a, 11a) and the first and second carrier elements are made of different materials, the first carrier element (11a) being made of plastic and the second carrier element (10a) being made of steel sheet, both carrier elements are rigid and comprise rims (12a, 13a, 14a) which point axially towards each other and on which at least one bearing ring (7, 8) is centered and each bearing ring (7, 8) is supported on the carrier elements (10a, 11a) by a flat annular surface extending at right angles to a longitudinal axis of the suspension strut (1a).

2. A suspension strut of claim 1 wherein the rims (12a, 13a) are arranged radially spaced from each other on the carrier elements (10a, 11a).

3. A suspension strut of claim 1 wherein the rim (12a) of the first carrier element (10a) centers the bearing ring (7) at an inner surface and the rim (13a) of the second carrier element (11a) centers the bearing ring (8) at an outer surface.

4. A suspension strut of claim 1 wherein the second carrier element (11a) is made chiplessly of deep drawn sheet metal.

5. A suspension strut of claim 1 wherein the bearing rings (7, 8) of the bearing (6) are made of a ring-shaped wire having welded together ends, said bearing rings (7, 8) comprising a stamped rolling element raceway on one side.

6. A suspension strut of claim 1 wherein the first carrier element (10a) is pot-shaped and comprises inner and outer circumferential rims (12a, 14a) extending at right angles towards the coil spring (21).

7. A suspension strut of claim 1 wherein the rim (14a) of the first carrier element (10a) surrounds the rim (13a) formed by an outer wall of the second carrier element (11a) and comprises a radially inwards directed end collar (23a) which forms a snap connection (22) with a projection formed on an end region (16a) of the rim (13a).

8. A suspension strut of claim 1 wherein an end of the coil spring (21) associated to the second carrier element (11a) oriented toward the shock absorber (20) and is supported directly on a radially extending contact surface on the second carrier element (11a).

9. A suspension strut of claim 1 wherein the second carrier element (11a) made of steel cooperates directly with the damping element (24a).

* * * * *